May 15, 1951 — R. C. EXLEY, SR — 2,552,946

ARTIFICIAL BAIT

Filed Dec. 3, 1947

INVENTOR.
Reginald C. Exley, Sr.
BY
Florian D. Miller
Atty.

Patented May 15, 1951

2,552,946

UNITED STATES PATENT OFFICE 2,552,946

ARTIFICIAL BAIT

Reginald C. Exley, Sr., Fairview, Pa.

Application December 3, 1947, Serial No. 789,511

3 Claims. (Cl. 43—42.13)

This invention relates generally to an artificial fish bait or lure and it relates more particularly to an artificial fish bait or lure adapted to move through the water so as to resemble a living, moving frog, bird, insect, or like creature, to attract a fish.

The principal difficulty heretofore encountered in an artificial bait or lure of the type herein described is that no means have been provided to adjust the angle of the outwardly extending fins or wings to obtain a rocking action of the bait with the results that the bait spins and submerges, which greatly lessens their effect as a lure or bait. The hinging devices for the fins or wings have also been inadequate in that considerable looseness with resultant up and down movement thereof is allowed causing spinning thereof. The inadequate hinging and the lack of angular adjustment in the wings of baits and lures now on the market always results in a spinning action of the body of the bait which applicant has found undesirable as a lure, especially fishing for particular types of game fish such as the muskellunge.

It is, accordingly, an object of my invention to overcome the above and other defects in artificial bait adapted to rock in the water from side to side in an upright position and it is more particularly an object of my invention to provide such a bait which is simple in construction, economical in cost, economical in manufacture, and efficient in use.

Another object of my invention is to provide an artificial bait having an elongated body with novel unitary brackets on opposite sides thereof for hinging wings or fins on the sides thereof, and also providing novel adjustable stops for limiting the rearward movement of the wings or fins.

Another object of my invention is to provide an artificial bait of the type described with hinging devices for the wings whereby they move in the same horizontal plane.

Other objects of my invention will become evident from the following detailed description, taken in conjunction with the accompanying drawings, in which Fig. 1 is a plan view of my novel artificial bait with the wings thereof extending outwardly;

Figure 1:
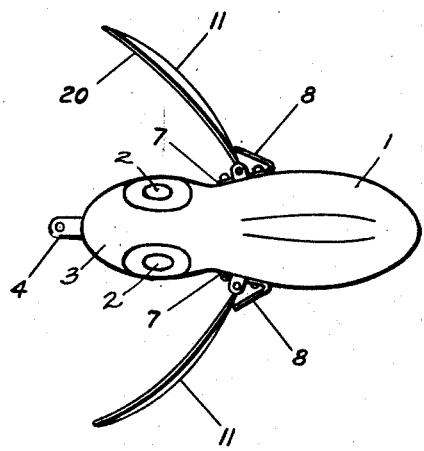
Figure 3:
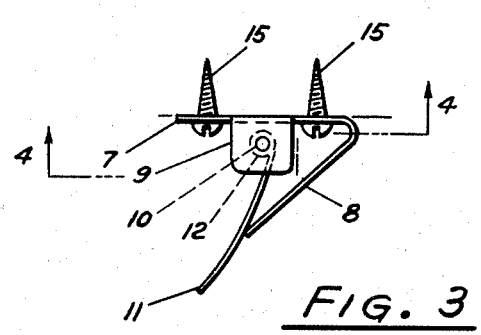
Fig. 3 is a detailed plan view of the bracket used on my artificial bait for hinging the wings and for adjusting the angularity thereof when the artificial bait moves forwardly in the water said wing being shown before it is manually twisted.
Figure 2:
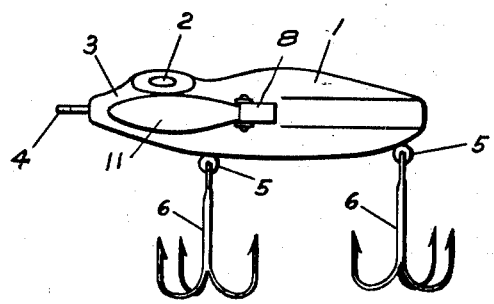
Fig. 2 is a side elevational view of the bait shown in Fig. 1.
Figure 4:
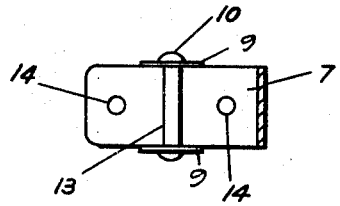
Fig. 4 is a view taken on the line 4—4 of Fig. 3 without the wing attached to the vertical shaft.

Referring now to the drawings, I show an elongated body portion 1 generally simulating the body of a large frog, insect, bird or like creature. Eyes 2 are painted on the rounded head end 3 of the body 1 to increase the effectiveness of my artificial bait as a lure for fish. A line engaging member 4 extends outwardly from the head end 3 of the body member 1 and is secured by any suitable means. Eye screws 5 engage the central bottom portion of the fish and have engaged therewith three prong hooks 6 which serve as the steadying members or keel to maintain the body member in an upright position in the water. Brackets 7 are disposed on opposite sides of the body member 1, preferably at a slight angle to the longitudinal axis of the body 1, and each bracket has the rear portion 8 thereof bent reversely to form an acute angle with the portion of the bracket 7 engaging the side of the body 1. Each bracket 7 has integral laterally extending, apertured, opposed ears 9 for journalling a vertically extending shaft 10 upon which is hingedly mounted a dished wing 11. The inner ends of the wings 11 are rolled back upon themselves in circular shape to form a circular cylindrical shaped portion 12 through which the shaft 13 extends. The bracket 7 has apertures 14 for receiving screw members 15 for securing the bracket 7 to the side of the body member 1. It will be evident upon inspection that the bracket 7 is a unitary structure preferably made from stamped metal and the thickness of the bracket 7 is comparatively small to permit angular adjustment of the reversely bent portion 8 of the bracket 7 to change the angular position of the wing 11 when the body member 1 moves forwardly through the water. When the bait is thrown through the air upon casting, the wings 11 move inwardly to a position adjacent the head end 3 of the body 1. As the body 1 moves forwardly in the water, the dished wings 11 spread outwardly until they engage reversely bent portions 8 of the brackets 7 which are adjusted to any predetermined angular position in order that the body 1 of the bait will rock to and fro in a smooth rocking movement without rotation or spinning thereof in the water. The upper portion 20 of the wings 11 are increasingly angularly tilted inwardly from the hinging points thereof so that the wings 11 will tend to rise upwardly in the water when the body member 1 is pulled forwardly therein. It will thus be seen that when one wing moves downwardly a predetermined amount in the water, it will be forced upwardly because of the angular tilt of the wing and increased resistance of the water causing the opposite wing to move downwardly in the water which in turn rises upwardly upon increased resistance thereby dipping oppositely disposed wings in the water successively to provide an easy rocking motion of the bait without spinning. Since the angularity of the wings 11 with reference to the body 1 is particularly important to prevent spinning, the reversely bent portions 8 of the brackets 7 are easily bent inwardly or outwardly to increase or decrease the angularity of the wings 11 with reference to the longitudinal axis of the body 1 while still permitting hinged movement thereof in a horizontal plane in that no misalignment results from the use of the flat ends of the reversely bent portion 8 of the brackets 7. The hooks 6 act as a keel to maintain the body 1 in an upright position. My novel body 1 is preferably made of a wood or light plastic but it will be evident that any suitable material may be used without departing from the spirit of my invention.

It will be evident from the foregoing description that I have provided a novel artificial bait for fish wherein novel means are provided for adjusting the angularity of the outwardly extending wings when they are in an out-stretched position with reference to the axis of the bait, novel hinge means for the wings, and novel unitary bracket members which provide integral means for adjusting the angularity of the wings when they are moved outwardly and further means for securely hinging the wings and maintaining the wings in a horizontal plane to prevent spinning of the bait.

Various changes may be made in the specific embodiment of my invention without departing from the spirit thereof or from the scope of the appended claims.

What I claim is:

1. An artificial bait comprising an elongated body simulating a creature, means for attaching a line to said body, hooks depending from said body, comparatively light gage metal brackets secured to opposite sides of said body each having a reversely bent rear portion defining an acute angle with the portions of said brackets adjacent said body, said reversely bent portion being bendable by the fingers of a human, a vertical shaft supported by each of said brackets, and transversely tilted wings hingedly supported on said shafts, said reversely bent portion of said brackets being adapted to engage the backs of said wings to limit the rotational movement thereof when said body is pulled forwardly.

2. An artificial bait as set forth in claim 1, wherein said brackets have opposed apertured laterally extending ears thereon in which said vertically extending shafts are journalled.

3. An artificial bait comprising an elongated body simulating a creature, means for attaching a line to said body, hooks depending from said body, comparatively light gage brackets secured to opposite sides of said body each having opposed, apertured, parallel, laterally outwardly bent ears and each having a reversely bent rear portion defining an acute angle with the portions of said brackets adjacent said body, said reversely bent portion of said brackets being angularly adjustable by the fingers of a human, a vertical shaft journalled in the apertures in said ears of said brackets, and transversely tilted wings having the base portions thereof looped transversely for hinged mounting on said shafts, said reversely bent portion of said brackets being adapted to engage the backs of said wings to limit the rotational movement thereof when said bait is pulled forwardly.

REGINALD C. EXLEY, Sr.

REFERENCES CITED

The following references are of record in the file of this patent:

UNITED STATES PATENTS

| Number | Name | Date |
|---|---|---|
| Re. 22,032 | Donaly | Feb. 24, 1942 |
| 289,508 | Dawson | Dec. 4, 1883 |
| 1,114,137 | Heddon | Oct. 20, 1914 |
| 1,200,135 | Reynolds | Oct. 3, 1916 |
| 2,090,106 | Carlson | Aug. 17, 1937 |
| 2,241,992 | Hall | May 13, 1941 |

FOREIGN PATENTS

| Number | Country | Date |
|---|---|---|
| 184,363 | Great Britain | Aug. 17, 1922 |